United States Patent

[11] 3,605,075

[72] Inventor Martin Alex Stofkooper
17420 Ventura Blvd., Encino, Calif. 91316
[21] Appl. No. 750,396
[22] Filed July 1, 1968
[45] Patented Sept. 14, 1971

[54] MODULAR ELECTRICAL SYSTEM
2 Claims, 11 Drawing Figs.

[52] U.S. Cl. ........ 339/126, 339/143, 339/176, 339/198, 339/278
[51] Int. Cl. ........ H01r 9/22
[50] Field of Search ........ 339/193, 112, 143, 14, 18, 176 MP, 278 D, 17 CF, 198

[56] References Cited

UNITED STATES PATENTS

| | | | |
|---|---|---|---|
| 2,440,037 | 4/1948 | Wolff et al. | 339/143 |
| 3,208,028 | 9/1965 | Mittler | 339/143 X |
| 3,391,382 | 7/1968 | Leibovitz | 339/17 X |
| 3,430,183 | 2/1969 | Feeser et al | 339/143 X |

*Primary Examiner*—Richard E. Moore
*Attorney*—Richard K. Macneill

ABSTRACT: A modular electrical system comprising a basic unit consisting of an insulative block having two parallel rows of electrical receptacle holes with spring contacts therein terminating in a loop on one end and a contact on the other side of the insulative block, the loop side preferably extending above the block, the insulative block having a conductive coating forming a shield on five sides thereof, the receptacle holes carrying the spring loop contacts being adapted and dimensioned for receiving dual-in-line packaged electrical component leads with a cover thereover for depressing the loop portion of the spring contacts creating a higher pressure contact between the spring and the component which results in a low resistance connection between the component leads and the other end of the spring contact via a conductive coating on the receptacle hole wall and the spring contact itself, the cover in a multimodular system can be a printed circuit board having conductive portions contacting the top of the spring loop; a heat sink disposed between the components and a power bus running between the two rows of receptacle holes; a pair of collars extending from one surface of the insulated block being dimensioned for a press fit within an aperture of a mounting plate or board.

INVENTOR.
MARTIN A. STOFKOOPER
BY
Richard K. Macneill

INVENTOR.
MARTIN A. STOFKOOPER
BY
Richard K. Macneill

INVENTOR
MARTIN A. STOFKOOPER
BY
Richard K. Macneill

INVENTOR.
MARTIN A. STOFKOOPER
BY
Richard K. Macneill

INVENTOR.
MARTIN A. STOFKOOPER
BY

Richard K. Macneill

MODULAR ELECTRICAL SYSTEM

BRIEF DESCRIPTION OF THE INVENTION

The present invention relates to a modular electrical system and more particularly to a modular electrical system for mounting and interconnecting dual-in-line packaged electrical components.

At the present time, integrated circuits have many physical forms, e.g., circular vacuum tube-type mountings, transistor-type mountings, linear pigtailed lead-type mountings and dual-in-line packaging. The electronics industry is leaning towards standardizing the dual-in-line package components making possible and practical the design of a standard modular electrical system for cooperation with dual-in-line packaged components in their mounting and electrical connection. Throughout the remainder of this application, dual-in-line packaged components will be referred to as "dip" components.

According to the invention, at least one insulative block having at least two parallel rows of conductively coated electrical receptacle holes therethrough for receiving electrical coupling contacts therein is provided. The block is preferably coated with a conductive coating on five sides. The receptacle holes each contain a spring contact which extends through and terminates on one side of the block in a spring loop preferably rising above the surface level of the receptacle holes and on the other side in a wire wrap or other suitable contact. A conductive strip runs between the two rows of receptacle holes for carrying power voltage. The conductive strip preferably terminates around at least one mounting hole through which it is connected to proper operating voltage. A heat sink is placed on top of the conductive strip separating it from components which are mounted on top of the heat sink with their electrical leads being press fit into the receptacle holes for coupling to external circuitry. If desired, a plurality of the insulative blocks, together with their associated parts, can be mounted on a printed circuit board with the printed circuit board having conductive portions in contact with the spring contact loops for interconnecting the circuitry as desired. In another embodiment, a cartridge cover with components mounted thereon is placed in contact with the basic unit.

An object of the present invention is the provision of a modular electrical system for interconnecting electrical components.

Another object of the invention is the provision of a modular electrical system which is extremely versatile and reliable.

Yet another object of the invention is the provision of a modular electrical system which is inexpensive to manufacture and assemble.

Other objects and many of the attendant advantages of the invention will be readily appreciated as the same becomes better understood by reference to the following detailed description when considered in connection with the accompanying drawings in which like reference numerals designate like parts throughout the figures thereof and wherein.

Figure 1:
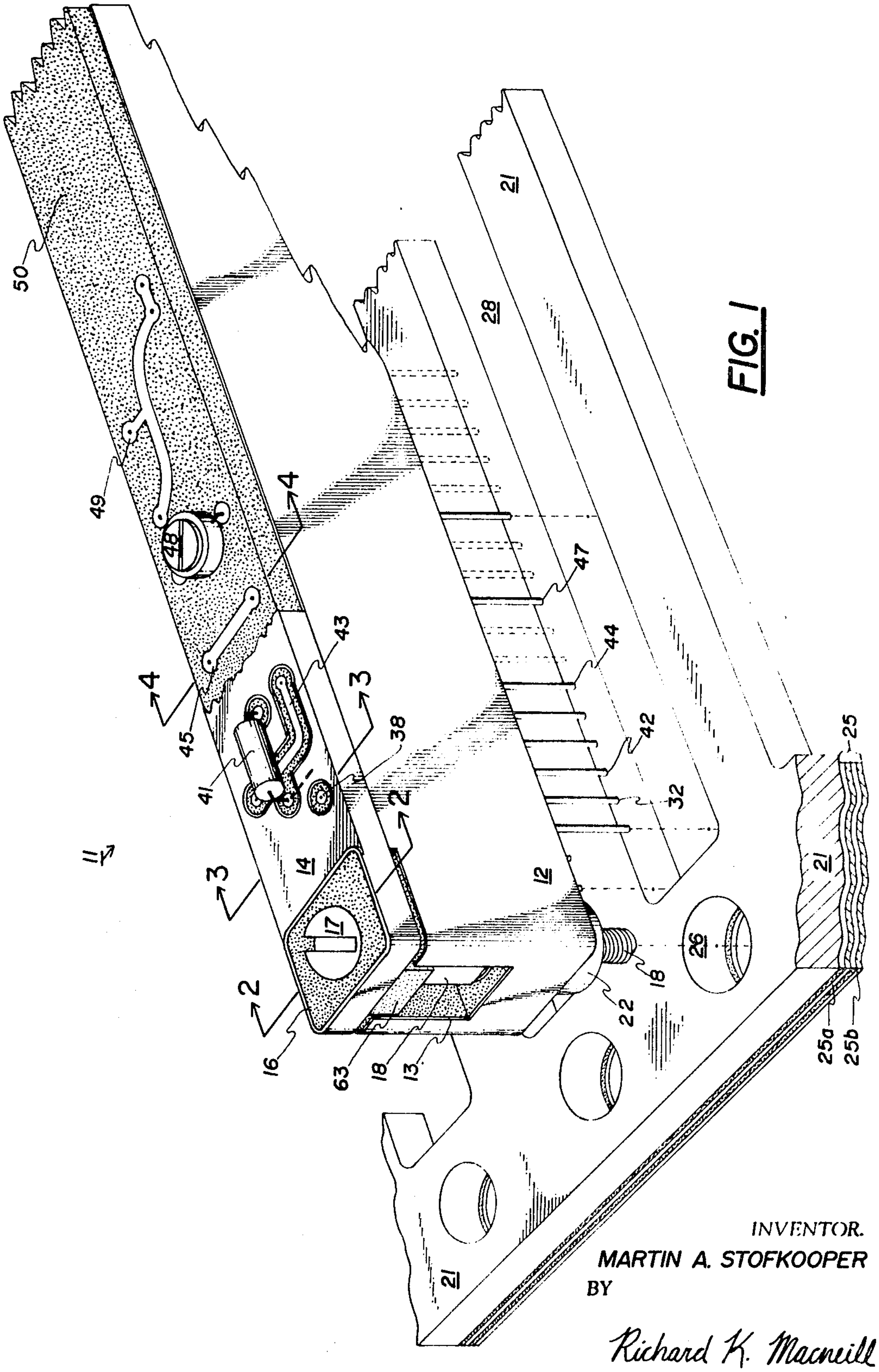
FIG. 1 is a perspective view partially exploded of a preferred embodiment of the present invention.
Figure 2:
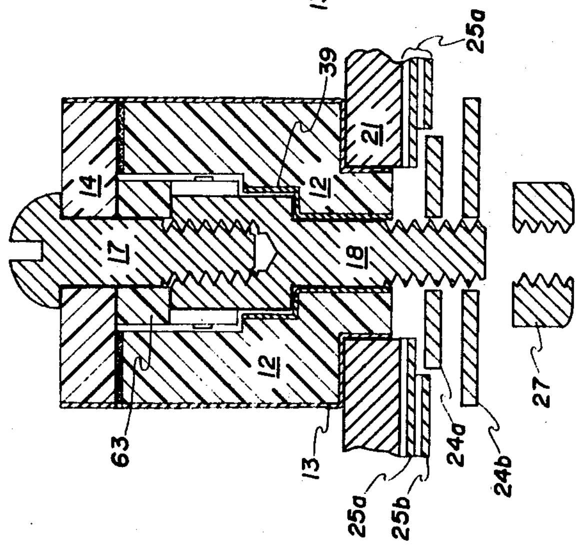
FIG. 2 is a cross section taken along lines 2—2 of FIG. 1.
Figure 10:
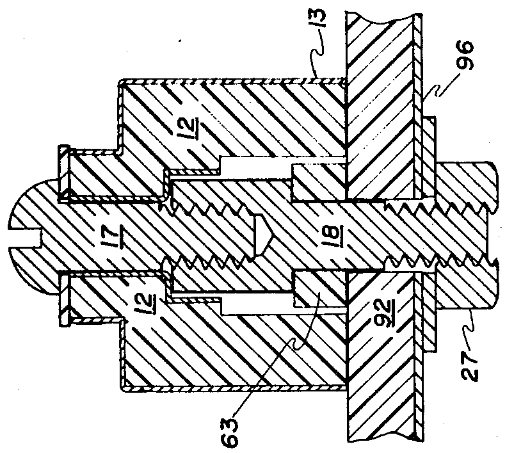
FIG. 10 is a cross section of the mounting taken along lines 10—10 of FIG. 8.

Referring to FIG. 1, one embodiment of the invention is shown at 11 in exploded relation to one form of mounting plate 21. Insulative block 12 has a conductive shielding 13 on all but its top side. Block 12 is shaped to receive a cartridge containing electronic components and subassemblies held captive between a heat sink base (not shown) and a cartridge cover 63. These members are retained within a groove in the block by a cover 14 through which a closing screw 17 passes to engage a threaded hole in bus mount fitting 18. The bus mount fitting has a threaded end which passes through aligning boss 22 on body 12 and a hole 26 in mounting plate 21 and is secured to a laminated metallic power bus 25 by a washer 24 and by nut 27 (FIGS. 2 and 10). The aligning boss 22 on body 12 and hole 26 in mounting plate 21 are structured to cause a tight slip fit or a press fit between the two members so that a multiplicity of contact pins 32, 42, 44, 47, etc., in linear array, will mate with cutout 28.

Cover 14 may have an integral metallic shield 16, shown to the left of section lines 2 and 4 in FIG. 1, or it may have interconnecting electrical contacts on an insulative material as shown to the right of section line 4, or it may be a simple insulative strip 50. A few combinations of these features are shown at: (a) closing screw 17 where shielding 16 is omitted from the surrounding area to provide an insulated test point for bus power; (b) point 38 where shielding is omitted to provide a test point in contact with pin 32; (c) component 41 where shielding 16 is twice interrupted to insert the component between pin 42 and an opposite offset pin (not shown) by means of shaped conductive surfaces inside cover 14; (d) interconnection 43 where shielding 16 is interrupted to allow connection of pin 44 with an opposite offset pin (not shown) through a shaped conductive surface; (e) interconnection 45 where pin 47 is connected by a shaped conductive surface to the pin directly opposite; (f) component 48 which is connected between two opposite pins (one not shown), and (g) shaped conductive surface 49 which interconnects several opposite and offset pins (not shown). Means of establishing electrical contact with the respective pins is described in a subsequent figure.

Referring to FIG. 2, insulative block 12 has a conductive coating 13 on two sides thereof and a conductive coating 39 in contact with bus mount fitting 18 which is threadably engaged with mounting screw 17. Mounting screw 17 secures cartridge cover 63 between bus mount fitting 18 and cover 14. Bus mount fitting 18 is coupled via washer 24 to voltage bus 22 in laminated strip 25*a* or through washer 25*b* to voltage bus 23 on laminated strip 25*a*. Lock nut 25 holds either washer 24 or 25*b* securely against voltage strip 22 or 23 in laminated strip 25*a*, depending upon which voltage bus is desired to be contacted, i.e., both washers 24 and 25*b* will not be used, but only one, depending upon design choice.

Figure 3:
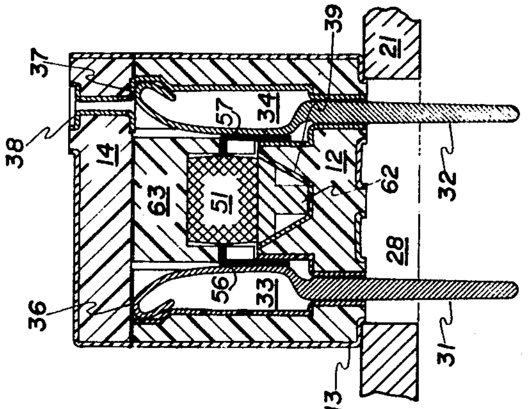
FIG. 3 is a cross-sectional view taken along lines 3—3 of FIG. 1.

FIG. 3 is a cross section of assembly 11 at station 3 and is typical of a dip component station. A cavity in block 12 is shown with conductively lined slots 33 and 34. Spring pins 31 and 32 which pass down through the insulated structure of block 12 are shown compressed by inside surface of cover 14 in the pressure areas 36 and 37. With cover removed, the curved surfaces of the spring pins will project above the upper surface of block 12. Heat sink base 62 and cartridge cover 63 hold captive a dip electronic package 51 so that leads 56 and 57 in slots 33 and 34 are in contact with spring pins 31 and 32, respectively. Heat sink base 62 is seated in a shaped channel plated internally with conductive bus plating 39. The outermost surfaces of the insulated channel form the innermost lower surfaces of slots 33 and 34 which serve as bucking surfaces against pressures of the spring pins and allow application of additional contact pressure from closure of cover 14 without damage to contacts 56 and 57. Closure of cover 14 brings test point 38 in contact with spring pin 32 and also forces spring pin 32 to contact conductive lining of slot 34 creating a multipath circuit between the spring pin and contact 57 which increases continuity reliability.

Figure 4:
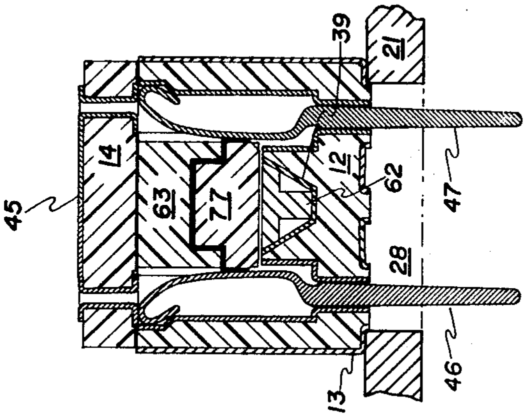
FIG. 4 is a cross-sectional view taken along lines 4—4 of FIG. 1.

Referring to FIG. 4, insulative block 12, cover 14, and the cavity within block 12 are identical to the section shown in FIG. 3 as are the spring pins here shown as 46 and 47. The visible components of the cartridge, the cover 63, and the heat sink base 62 are in positions identical with those shown in FIG. 3 but, in this case, a vertical separator 77 is inserted into a slot in the cartridge cover 63. Vertical separator 77 may be either insulative or conductive, as shown effecting a circuit connection between spring pins 46 and 47. An alternate method of interconnecting the spring pins is shown at 45 on the upper surface of cover 14 where a shaped conductive surface is carried through the cover to conductive surfaces which contact pins 46 and 47 in the pressure areas referred to in FIG. 2 (36 and 37).

Figure 5:
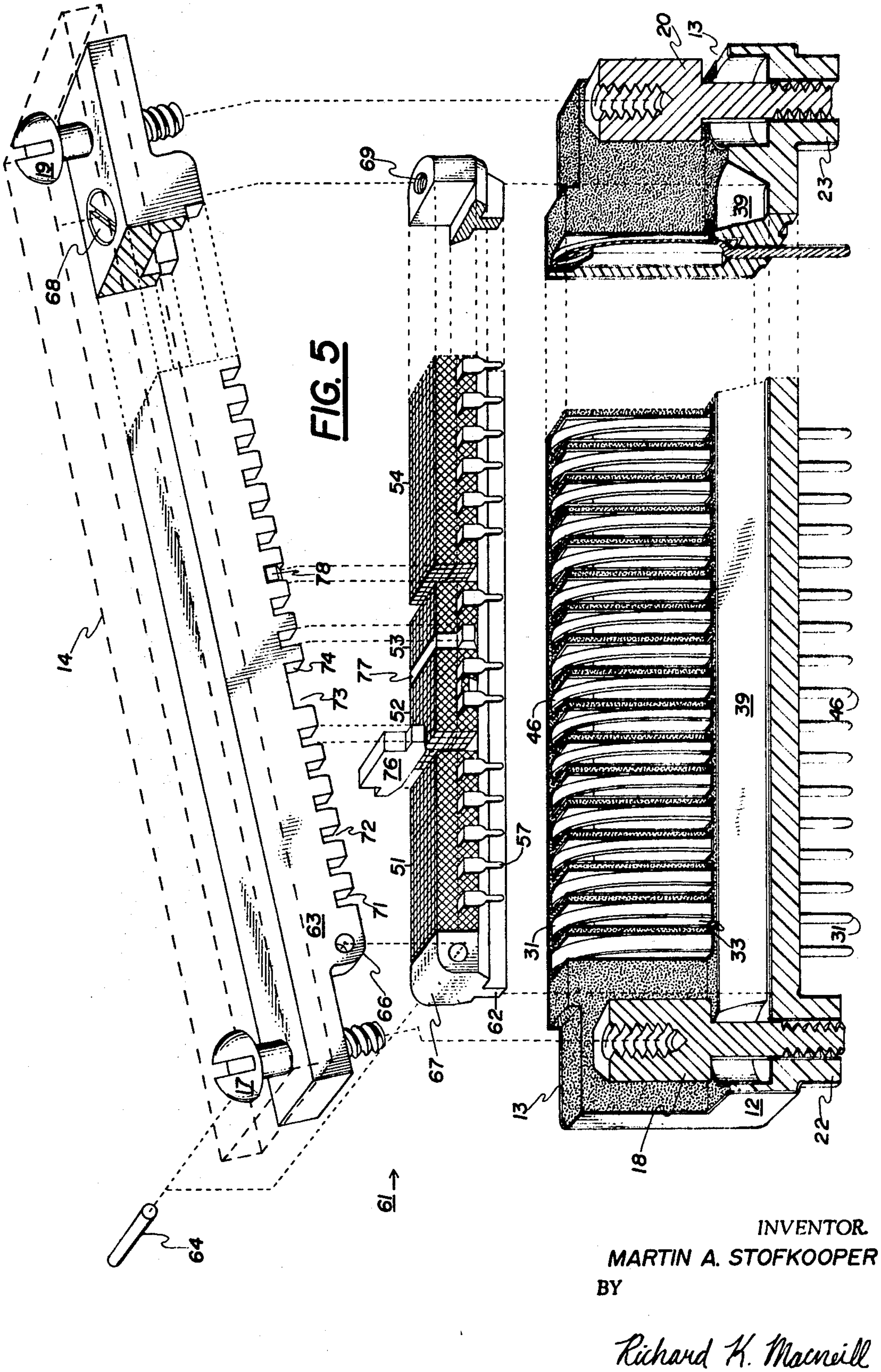
FIG. 5 is an exploded perspective view showing a modification of the embodiment of FIG. 1.

Referring to FIG. 5, cover 14 is shown in phantom to indicate placement only. Block 12 is shown sectioned through the center line between bus mount fittings 18 and 20 which pass through aligning bosses 22 and 23. The body shield plating 13 is shown in complete continuity for the length of the strip on the end and back surfaces and extends into the cavity of block 12 to effect contact with bus mount fitting 20. Bus plating 39 extends along the length of the strip and electrically contacts bus mount fitting 18. Insulative areas are shown as dot-shaded sections and conductive cavity 33, spring pin 31, spring pin 46 and dip lead 57 are referenced to refer to previous figures. Heat sink base 62 and cartridge cover 63 are shown in hinged exploded relationship. The hinge pin 64 passes through hinge tabs 66 and the hinge boss 67. Dip components 51, 52, 53, 54, etc., contact the upper surface of heat sink base 62. Cartridge cover 63 has a multiplicity of slots 33, etc., in block 12. Vertical separators 76, 77 and 78 are aligned in the slots to positively locate dip packages 51, 52, 53 and 54 in contact correspondence with the contact slots in block 12. Separator 76 is shown in space between the hinged cartridge cover 63 and the heat sink base 62 while separator 77 is shown between packages 52 and 53, as though the cartridge assembly 61 were closed. Separator 78 is shown inserted in the slot in cartridge 63 to indicate separation between packages 53 and 54.

When heat sink base 62 is assembled to hinged cartridge 63 by means of hinge pin 64, the entire assembly of package 51, separator 76, package 52, separator 77, package 53, separator 78, package 54, etc., is held in permanent position by lock screw 68 which passes through cartridge cover 63 and is firmly set in threaded hole 69. Hinged cartridge cover 63 may be modified as shown in slot areas 73 and 74 to accept a special package 52 in that area only. When the locked cartridge 61 is firmly placed in the base of the cavity of body 12, it is held in position by cover 14 and secured by closing screws 17 and 19 which pass through the ends of cartridge 63 and are respectively secured in the threaded holes of bus mount fittings 18 and 20.

Figure 6:
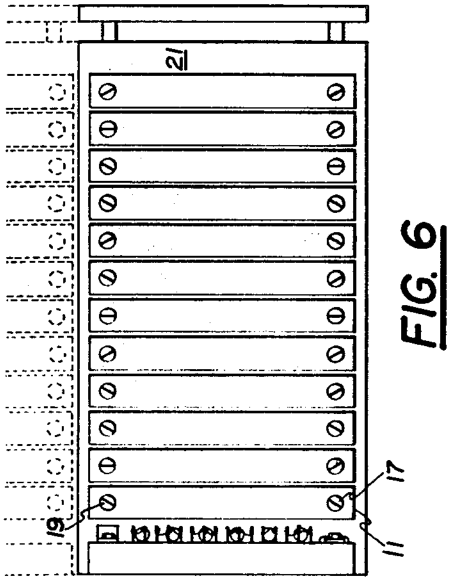
FIG. 6 is a top view showing a modular installation utilizing the present invention.

Referring to FIG. 6, a modular mounting of assemblies 11 is shown having a mounting base 21 with an assembly side by side shown in phantom indicating that any number of these assemblies can be mounted on one basic mounting base.

Figure 7:
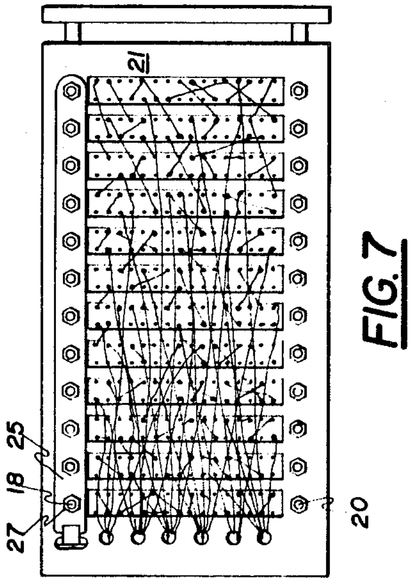
FIG. 7 is a bottom view of the modular system of FIG. 6.

Referring to FIG. 7, the underside of a portion of FIG. 6 is shown illustrating a variety of nuts 27 securing buss mount fittings 18 to laminated voltage strip 25 and other nuts securing the threaded end of buss mount fittings 20 to mounting base 21 to establish shield connection between basic units 11.

Figure 8:
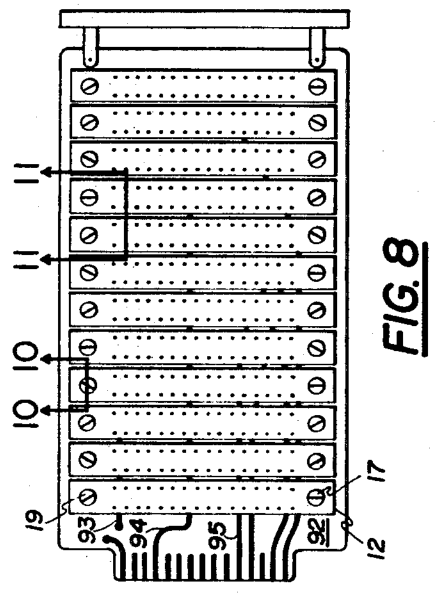
FIG. 8 is a top view of another modular system utilizing the present invention in conjunction with a printed circuit board.

Referring to FIG. 8, basic blocks 12 are shown in an alternate arrangement inverted on a printed circuit or plated circuit mounting board 92 and held captive thereto by the visible closing screws 17 and 19. Various shaped conductive surfaces 93, 94 and 95 contact various spring pins or shields in the multiplicity of body units 12. All pin portions or spring pins previously mentioned in figure descriptions protrude beyond the body 12 in the multiple array of units to provide interconnection between circuit elements of dip packages contained therein.

Figure 9:
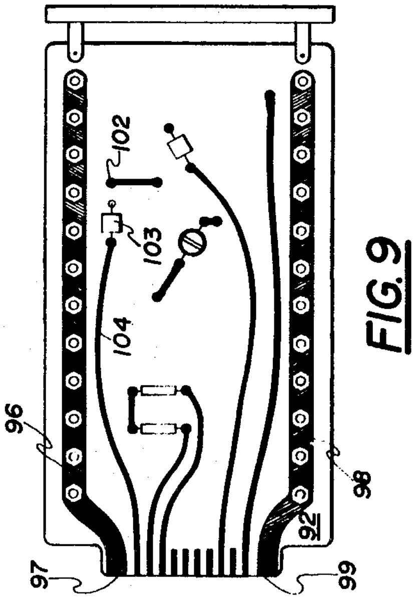
FIG. 9 is a bottom view of the modular system of FIG. 8.

Referring to FIG. 9 the reverse side of FIG. 8 is shown having a plated circuit mounting board 92 with various components 103 and shaped conductive surfaces 102 and 104 mounted on said reverse side and having a common shield line 96 coupled to output strip 97 with a voltage line 98 coupled to output strip 99, and nut-secured electrical connections similar to those of FIG. 7.

Referring to FIG. 10, block 12 is shown with its conductive shielding 13 in an inverted relationship to that shown in FIG. 2. The body is held to printed circuit board 92 by a reversed relationship of closing screw 17, bus mount fitting 18 and nut 27. Bus plating 96 on printed circuit board 92 is connected physically and electrically to bus mount fitting 18.

Figure 11:
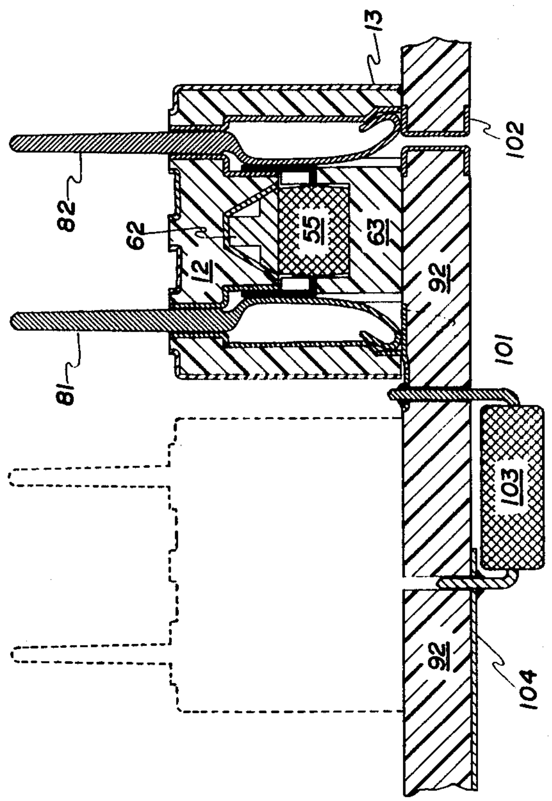
FIG. 11 is a cross section of a contact station taken along lines 11—11 of FIG. 8.

Referring to FIG. 11, block 12 is shown in cross section having spring pins 81 and 82 in pressure relationship with plating 101 and 102, respectively, on printed circuit board 92. Component 103 is coupled electrically to shaped conductive surfaces 101 and 104. Within the block 12, dip package 55 is held in a pressed secure relationship between cartridge cover 63 and heat sink base 62.

It should be understood, of course, that the foregoing disclosure relates to only preferred embodiments of the invention and that it is intended to cover all changes and modifications of the examples of the invention herein chosen for the purposes of the disclosure which do not constitute departures from the spirit and scope of the invention.

The invention claimed is:

1. A modular electrical system comprising:

an insulative block having at least two parallel rows of electrical receptacle holes therethrough for receiving and electrically coupling plug contacts therein and a plurality of mounting holes, said insulative block having a complete conductive coating for shielding on at least one side thereof; and a conductive voltage bus strip on said block, said conductive voltage bus strip being disposed between two of said at least two rows of electrical receptacle holes, said conductive voltage bus strip terminating on at least one end around one of said mounting holes.

2. A modular electrical system comprising:

an insulative block having at least two parallel rows of electrical receptacle holes therethrough for receiving and electrically coupling plug contacts therein and a plurality of mounting holes, said insulative block having a complete conductive coating for shielding on at least one side thereof;

a conductive spring contact being mounted in each of said receptacle holes; and a conductive voltage bus strip on said block, said conductive voltage bus strip being disposed between two of said at least two rows of electrical receptacle holes, said conductive strip terminating on at least one end around one of said mounting holes.